US008036261B2

(12) United States Patent
Tsutsui et al.

(10) Patent No.: US 8,036,261 B2
(45) Date of Patent: Oct. 11, 2011

(54) FEATURE-VECTOR GENERATION APPARATUS, SEARCH APPARATUS, FEATURE-VECTOR GENERATION METHOD, SEARCH METHOD AND PROGRAM

(75) Inventors: Hideki Tsutsui, Kawasaki (JP); Masaru Suzuki, Kawasaki (JP); Toshihiko Manabe, Kamakura (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1721 days.

(21) Appl. No.: 11/269,640

(22) Filed: Nov. 9, 2005

(65) Prior Publication Data

US 2006/0101065 A1 May 11, 2006

(30) Foreign Application Priority Data

Nov. 10, 2004 (JP) ................................. 2004-326811

(51) Int. Cl.
*G06F 7/00* (2006.01)
*H04B 1/66* (2006.01)
*G10L 15/26* (2006.01)
(52) U.S. Cl. ........................................ 375/240; 704/235
(58) Field of Classification Search .............. 386/46, 386/75, 95; 375/240; 348/465; 704/235; 707/100
See application file for complete search history.

(56) References Cited

U.S. PATENT DOCUMENTS

| 6,061,680 | A | 5/2000 | Scherf et al. |
| 2003/0212810 | A1* | 11/2003 | Tsusaka et al. ............... 709/231 |
| 2004/0218896 | A1* | 11/2004 | Abe et al. ......................... 386/46 |
| 2005/0060741 | A1 | 3/2005 | Tsutsui et al. |

FOREIGN PATENT DOCUMENTS

| JP | 07-046517 | 2/1995 |
| JP | 2001-126050 | 2/1995 |
| JP | 2001-126050 | * 10/1999 |
| JP | 2001-148841 | 5/2001 |
| JP | 2001-298431 | 10/2001 |
| JP | 2003-257160 | 9/2003 |

OTHER PUBLICATIONS

Notification of Reasons for Rejection mailed Jan. 20, 2009 in Japanese Patent Application No. 2004-326811, 4 pages.
Notification of Reasons for Rejection mailed Aug. 6, 2009 in Japanese Patent Application No. 2004-326811, 2 pages.

* cited by examiner

*Primary Examiner* — Vu Le
*Assistant Examiner* — Amara Abdi
(74) *Attorney, Agent, or Firm* — Finnegan, Henderson, Farabow, Garrett & Dunner, L.L.P.

(57) ABSTRACT

A feature-vector generation apparatus includes an input unit configured to input content data including at least one of video data and audio data, a generation unit configured to generate a feature vector, based on information indicating a time at which a characterizing state of the content data appears, the characterizing state being characterized by a change of the at least one of the video data and the audio data, and a storage unit configured to store the content data and the feature vector.

13 Claims, 9 Drawing Sheets

| Data ID | Feature vector | Feature information | Link information linked to content |
|---|---|---|---|
| 1 | 11,10,15,6,4 | Images A1, A2, ... | R1 |
| 2 | 1,9,8,7,12,3,4 | Images B1, B2, ... | R2 |

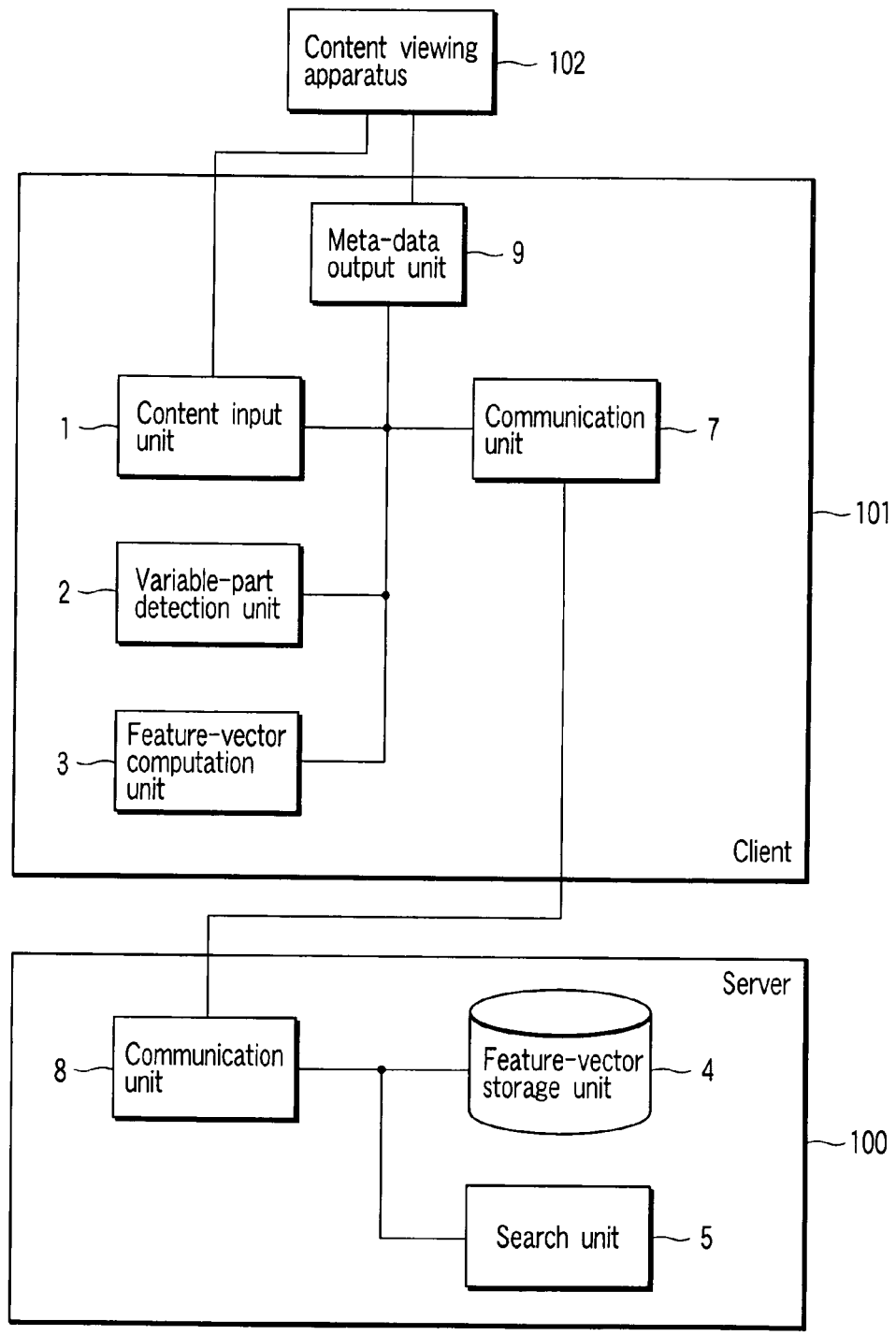
F I G. 5

| Data ID | Feature vector | time | Meta-data | Link information linked to content |
|---|---|---|---|---|
| 1 | 11,10,15,6,4 | 153000 | What a fine play! | |
| 2 | 11,10,15,6,4 | 165000 | Yesterday, this player played like this. | 10,5,13,5,4,6:326000 |
| 3 | 11,10,15,6,4 | 182000 | Nice play, isn't it? | |

| Data ID | Feature vector | BBS-url |
|---|---|---|
| 1 | 11,10,15,6,4 | http://www.xxx/index.html |
| 2 | 1,9,8,7,12,3,4 | http://www.xyz/index.html |
| 3 | 10,9,2,8,3,7,8 | http://www.yyy/index.html |

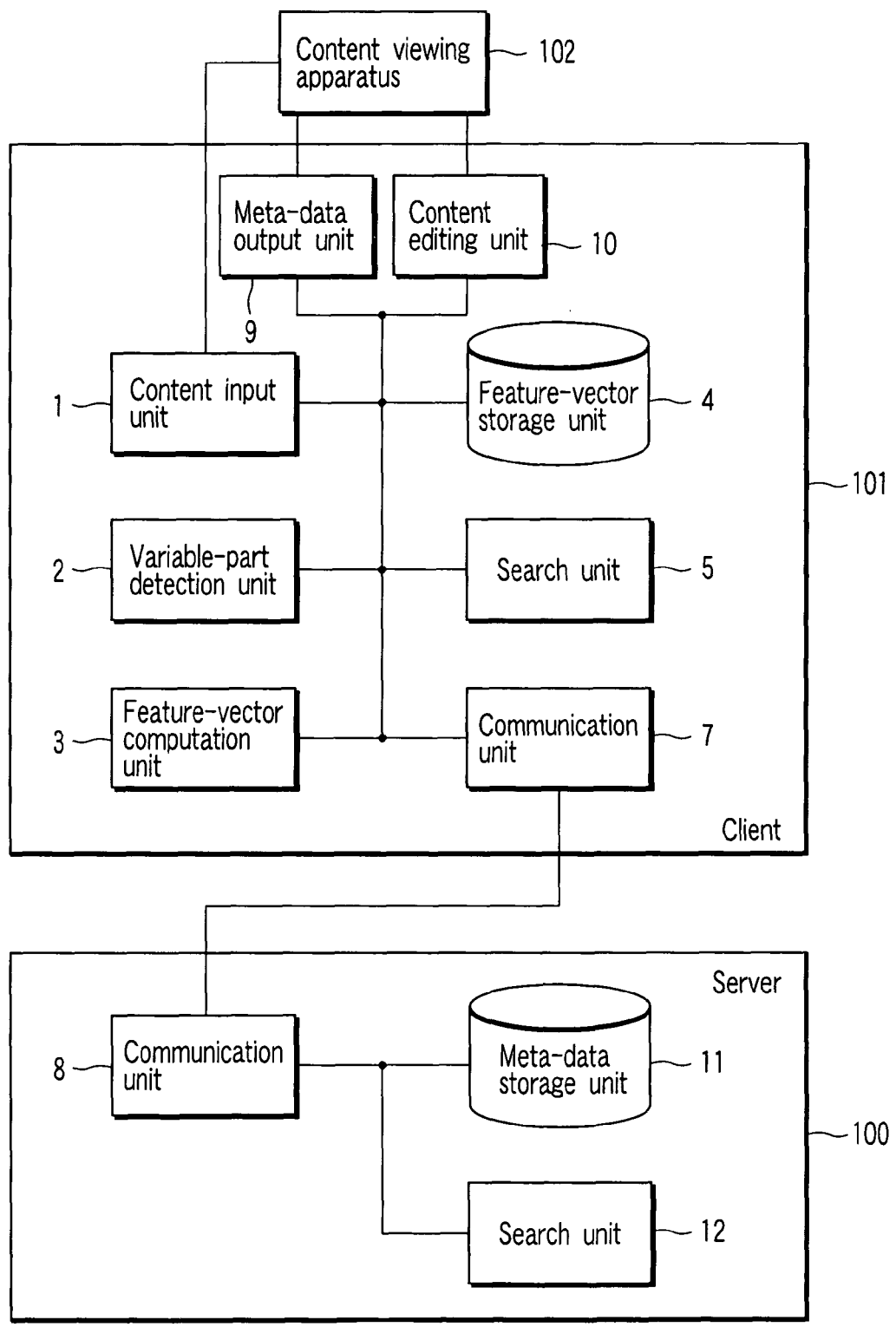
F I G. 9

```
<metadata>
  <video>
    <videoid=1>
    <uri vector=1,9,8,7,12,3,4>
    <uri time=153000>
    <uri duration=1000>
  </video>
  <audio>
    <audioid=1>
    <uri vector=1,9,8,7,13,2,1>
    <uri time=153000>
    <uri duration=1000>
  </audio>
  <text>
    <message>This is part A of the show</message>
    <videoid>1</videoid>
    <time=5>
    <duration=20>
  </text>
  <video>
    <videoid=2>
    <uri vector=10,9,2,8,3,7,8>
    <uri time=154800>
    <uri duration=50000>
  </video>
  <audio>
    <audioid=2>
    <uri vector=10,9,2,8,3,7,8>
    <uri time=154800>
    <uri duration=50000>
  </audio>
  <text>
    <message>This is part B of the show</message>
    <videoid>2</videoid>
    <time=10>
    <duration=20>
  </text>
</metadata>
```

FIG. 10

| Data ID | Feature vector | Attribute information | Meta-data |
|---|---|---|---|
| 1 | B1001 | E1001 | M1001 |
| 2 | B1010 | E1010 | M1010 |
| | | | |

FEATURE-VECTOR GENERATION APPARATUS, SEARCH APPARATUS, FEATURE-VECTOR GENERATION METHOD, SEARCH METHOD AND PROGRAM

CROSS-REFERENCE TO RELATED APPLICATIONS

This application is based upon and claims the benefit of priority from prior Japanese Patent Application No. 2004-326811, filed Nov. 10, 2004, the entire contents of which are incorporated herein by reference.

BACKGROUND OF THE INVENTION

1. Field of the Invention

The present invention relates to a data generation method for generating data used to identify content, and a search apparatus using this method.

2. Description of the Related Art

There is a conventional method for searching for content using an ID assigned thereto. In this method, if desired content is broadcasting one, it is searched for using a broadcasting date or broadcasting station as a key.

Further, a method is disclosed in which each viewing audience takes part in the communities corresponding to respective pieces of content, and each community is determined from content they enjoy (see, for example, Jpn. Pat. Appln. KOKAI Publication No. 2001-148841). More specifically, each community is determined from the date and channel corresponding to the content.

A technique for using synchronization data embedded in content to synchronize the content with a dialog screen is also disclosed (see, for example, Jpn. Pat. Appln. KOKAI Publication No. 2001-298431).

However, pieces of broadcasting content do not have content IDs, and the same content may well be broadcasted at different broadcasting times and by different stations between different local areas. Therefore, it is sometimes difficult for the conventional methods to identify content.

As described above, content sometimes cannot be detected based on its broadcasting station or date/hour because the broadcasting date/hour and channel may well differ between local areas or when the content is rebroadcasted.

BRIEF SUMMARY OF THE INVENTION

In accordance with a first aspect of the invention, there is provided a feature-vector generation apparatus comprising: an input unit configured to input content data including at least one of video data and audio data; a generation unit configured to generate a feature vector, based on information indicating a time at which a characterizing state of the content data appears, the characterizing state being characterized by a change of the at least one of the video data and the audio data; and a storage unit configured to store the content data and the feature vector.

In accordance with a second aspect of the invention, there is provided a search apparatus comprising: a storage unit configured to store each of feature vectors in relation to at least one of content data and meta data of the content data, the content data including at least one of video data and audio data, the feature vectors being generated based on information indicating times at which characterizing states of the content data appear respectively, the characterizing states being characterized by changes of the at least one of the video data and the audio data respectively; a variable-part detection unit configured to detect a variable part in first content data including at least one of video data and audio data; a generation unit configured to generate a first feature vector, based on information indicating times at which characterizing states of second content data appear, the second content data acquired by excluding the variable part from the first content data; and a search unit configured to search the feature vectors stored in the storage unit for a feature vector similar to the first feature vector.

In accordance with a third aspect of the invention, there is provided a search apparatus comprising: a storage unit configured to store each of feature vectors in relation to meta data of content data, the content data including at least one of video data and audio data, the feature vectors being generated based on information indicating times at which characterizing states of the content data appear respectively, the characterizing states being characterized by changes of the at least one of the video data and the audio data respectively; a receiving unit configured to receive a search request including a first feature vector as a search condition, the first feature vector being generated based on information indicating times at which characterizing states of first content data appear respectively; a search unit configured to search the feature vectors stored in the storage unit, for a feature vector similar to the first feature vector; and a transmission unit configured to transmit, to a requester of the search request, a search result including meta data of the feature vector detected by the search unit.

In accordance with a fourth aspect of the invention, there is provided a search apparatus comprising: a storage unit configured to store each of feature vectors in relation to meta data and electronic program guide (EPG) information corresponding to content data, the content data including at least one of video data and audio data, the feature vectors being generated based on information indicating times at which characterizing states of the content data appear respectively, the characterizing states being characterized by changes of the at least one of the video data and the audio data respectively; a receiving unit configured to receive a search request including a first feature vector as a search condition or including, as search conditions, the first feature vector and first EPG information of first content data including at least one of video data and audio data, the first feature vector being generated based on information indicating times at which characterizing states of the first content data appear respectively; a search unit configured to search the EPG information for EPG information identical to the first EPG information, if the search request includes the first EPG information, the search unit searching the feature vectors for a feature vector similar to the first feature vector, if EPG information identical to the first EPG information fail to be detected or if the first EPG information fail to be included in the search request; and a transmission unit configured to transmit, to a requester of the search request, a search result including meta data related to the EPG information identical to the first EPG information and detected by the search unit, or a search result including meta data which is related to the feature vector similar to the first feature vector and is detected by the search unit.

In accordance with a fifth aspect of the invention, there is provided a feature-vector generation method of generating a feature vector, based on information indicating times at which characterizing states of the content data appear respectively, the characterizing states being characterized by changes of at least one of the video data and the audio data respectively.

In accordance with a sixth aspect of the invention, there is provided a search method comprising: preparing a storage unit configured to store each of feature vectors in relation to at least one of content data and meta data of the content data, the content data including at least one of video data and audio data, the feature vectors being generated based on information indicating times at which characterizing states of the content data appear respectively, the characterizing states being characterized by changes of the at least one of the video data and the audio data respectively; detecting a variable part in first content data including at least one of video data and audio data; generating a first feature vector, based on information indicating times at which characterizing states of second content data appear, acquired by excluding the variable part from the first content data; and searching the feature vectors stored in the storage unit for a feature vector similar to the first feature vector.

In accordance with a seventh aspect of the invention, there is provided a computer-readable program stored in a recording medium, comprising: means for instructing a computer to access a storage unit configured to store each of feature vectors in relation to at least one of content data and meta data of the content data, the content data including at least one of video data and audio data, the feature vectors being generated based on information indicating times at which characterizing states of the content data appear respectively, the characterizing states being characterized by changes of the at least one of the video data and the audio data respectively; means for instructing the computer to detect a variable part in first content data including at least one of video data and audio data; means for instructing the computer to generate a first feature vector, based on information indicating times at which characterizing states of the second content data appear, the second content data acquired by excluding the variable part from the first content; and means for instructing the computer to search the feature vectors stored in the storage unit for a feature vector similar to the first feature vector.

BRIEF DESCRIPTION OF THE SEVERAL VIEWS OF THE DRAWING

FIG. 5 is a block diagram illustrating a configuration example of a search system according to a third embodiment;

FIG. 9 is a block diagram illustrating a configuration example of a search system according to a fourth embodiment;

FIG. 10 is a view illustrating an example of meta data used to edit content;

DETAILED DESCRIPTION OF THE INVENTION

Embodiments of the invention will be described with reference to the accompanying drawings.

The embodiments of the invention are directed to methods and apparatuses for generating data capable of identifying any content without information belonging thereto, such as a broadcasting station or broadcasting date. Further, the embodiments are directed to methods and apparatuses for easily searching for content or meta data of the content using the generated identification data.

In the embodiments of the invention, any content can be identified without information belonging thereto, such as a broadcasting station or broadcasting date.

Descriptions will be given of a feature unique to input content data (hereinafter referred to simply as a "content"), and search systems for generating a feature vector used to identify the content, and searching for the content or meta data corresponding to the content using the feature vector.

In this description, each piece of content is time-series data containing image data (video data), such as a still image or moving image, and audio data. The above-mentioned feature vector is generated based on information indicating, for example, the times at which characterizing states (video changes or audio changes; e.g., a scene change, a silent zone, or a state in which the sound level is not less than a predetermined level) appear in image or audio data of the content.

Firstly, a description will be given of a feature-vector generation apparatus according to a first embodiment and incorporated in search systems described later.

First Embodiment

Figure 1:
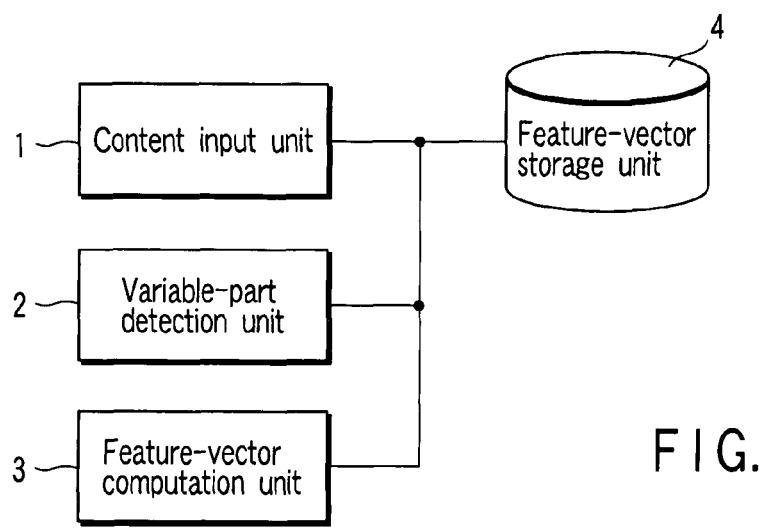
FIG. 1 is a block diagram illustrating a configuration example of a feature-vector generation apparatus according to a first embodiment of the invention.

FIG. 1 is a block diagram illustrating a configuration example of the feature-vector generation apparatus of the first embodiment. As shown, this apparatus comprises a content input section 1 for receiving content, and a variable-part detection unit 2 for detecting a variable part in the input content. The apparatus further comprises a feature-vector computation unit 3 for detecting a feature vector in a non-variable part acquired by excluding the variable part from the content, and a feature-vector storage unit 4 for storing the feature vector computed by the feature-vector computation unit 3.

Figure 2:
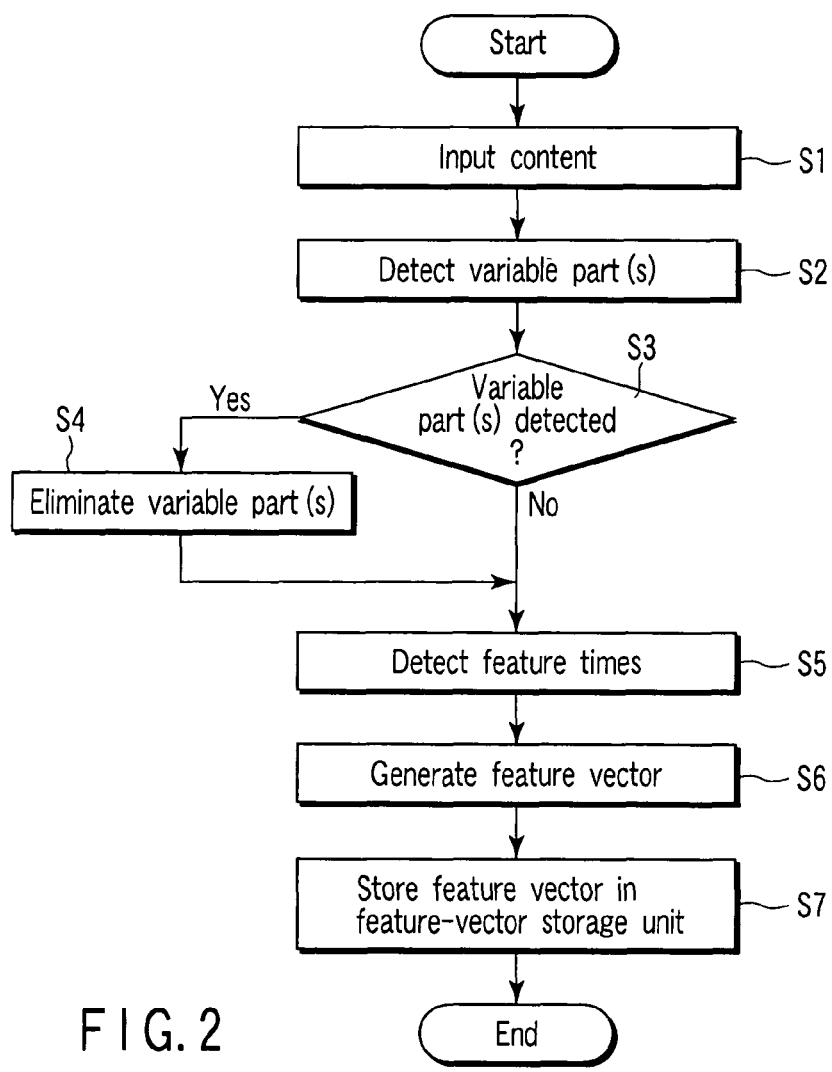
FIG. 2 is a flowchart useful in explaining the operation of the feature-vector generation apparatus of FIG. 1.

FIG. 2 is a flowchart useful in explaining the operation of the feature-vector generation apparatus of FIG. 1. Referring to FIG. 2, each element of FIG. 1 will be described.

Firstly, content is input to the content input unit 1 (step S1). The content is, for example, recorded broadcasting content or DVD content available in the market.

The variable-part detection unit 2 detects a variable part (variable parts) in the content input to the apparatus through the content input unit 1 (step S2). The variable parts mean parts in which replacement or omission occurs, and are, for example, CM (commercial message) parts. The CM parts are detected using, for example, the following methods: (1) Cut detection is performed. If a cut is detected in units of 15 seconds (or 30 seconds), the present part is determined to be a CM part. (2) The fact that there is a silent zone before and after a CM is utilized. If such a silent zone is detected in units of 15 seconds (or 30 seconds), this zone is determined to be a CM part. (3) If a stereo broadcasting part is included in monophonic program content, it is determined to be a CM part. (4) Image patterns corresponding to CMs are stored. If there is a part that matches one of the image patterns, it is determined to be a CM part. (5) As disclosed in, for example, Jpn. Pat. Appln. KOKAI Publication No. 2003-257160, a CM part is detected utilizing an audio mode for TV signals, a video signal level pattern and an audio signal level pattern. This method is used to detect a CM part included in, for example, bilingual program-content.

The variable-part detection unit 2 detects a CM part (CM parts) in input content, utilizing one of the above methods or a combination of them.

In the above method (4), CM image patterns may be stored using, for example, the above method (5). In this case, when a CM part is detected using the difference in audio-mode, the image pattern of the CM part is stored. If the same image as the image pattern is detected, it is determined to be a CM. CM image patterns may also be stored using the above method (3). In this case, if a stereo broadcasting part is included in monophonic program content, it is determined to be a CM part, and its image pattern is stored. Note that it is not necessary to store an image pattern all the time, and it is sufficient if the pattern is stored at regular intervals of, for example, 5 seconds. Further, it is desirable that the data size be reduced by, for example, reducing image size of each image stored or converting a color image into a monochrome image. Each stored image pattern is represented by a sequence of brightness values. These values are represented by a vector, and this vector is compared with content to detect a CM part.

Further, the variable-part detection unit 2 also determines that the opening and ending parts of program content, in which opening and ending theme songs are sung, are variable parts. The variable-part detection unit 2 may be made to determine that the part in which the same feature vector is generated at regular intervals (e.g., very week or every day) is a variable part.

If a variable part (variable parts) is detected in content as described above (step S3), the program proceeds to step S4, where the variable part(s) is eliminated from the content.

Variable parts are mainly CM parts, but may also be some other sorts of parts, such as the above-mentioned theme song parts or the parts in which a certain feature vector is periodically generated. When generating a feature vector, to-be-eliminated variable parts may be selected. For instance, CM parts may be left as they are and only theme song parts, which form the opening and ending parts of content, be eliminated. This is suitable for the case of aiming a search for CM parts.

After the variable part(s) is eliminated from the input content at step S4, the program proceeds to step S5, where the feature-vector computation unit 3 firstly detects, for generating a feature vector, feature times in the content having its non-variable part(s) acquired by excluding the variable part(s) from the content. The feature times are, for example, the time when scene change occurs in the content, when a silent zone appears (e.g., the start point of the silent zone), and when the sound level exceeds a predetermined level. Each feature time may be set as the time when at least two of the above three states (i.e., the occurrence of scene change, the occurrence of a silent zone and the state in which the sound level exceeds the predetermined level) simultaneously appear, or one of the three states appears.

The time when scene change occurs is actually the time when a big change occurs in content, namely, when the entire image is significantly changed. To detect scene change, the time when the entire image is significantly changed is detected. Scene change can also be detected by a known technique, such as a technique for utilizing MPEG motion vectors.

Concerning a silent zone, a zone in which the sound level is lower than a predetermined threshold value is determined a silent zone. In this case, the time when the silent zone starts is detected as a feature time.

After each feature time is detected in the content having its non-variable part(s) acquired by excluding the variable part(s) from the content, the program proceeds to step S6, where the feature-vector computation unit 3 generates a feature vector based on the detected feature times. Specifically, the feature-vector computation unit 3 generates a feature vector using the number of the detected feature times, and the period ranging from the head of the content with no variable parts to each feature time. In this embodiment, the zones acquired by dividing the content by the feature times will be referred to as segments. The feature vector is a sequence of numerical values indicating the respective temporal lengths of the segments arranged in order. The number of the numerical values included in the sequence is equal to the number of the feature times indicating features of the content, such as the number of scene changes and the number of silent zones included in the content.

For instance, if in certain content, feature times are detected 5 seconds, 8 seconds and 16 seconds after the start of the content, the temporal lengths of the segments are "5", "3" and "8", and are used as the components of a feature vector.

If the temporal lengths of segments are extremely short, for example, if feature times occur at intervals less than 1 seconds, the temporal lengths of the segments may be represented in units of seconds. For instance, when the feature times are 0.2 seconds, 1.8 seconds, 2.2 seconds, 3.5 seconds after the start of the content, if the temporal lengths of the segments are represented in units of 1/10 seconds, they are 0.2 seconds, 1.6 seconds, 0.4 seconds and 1.8 seconds, respectively. However, if these temporal lengths are represented using only integer parts (if, however, the temporal length is less than 1 second, it is rounded up), they are 1 second, 1 second, 1 second and 1 second, respectively.

In the embodiment, the feature vector is formed of a sequence of numerical values indicating the temporal lengths of the segments arranged in order, the embodiment is not limited to this. Alternatively, the feature vector may be formed of a sequence of numerical values indicating the periods ranging from the start of content (having its non-variable part(s) acquired by excluding the variable part(s) from the content) to the respective feature times. Namely, if the feature times are detected 5 seconds, 8 seconds and 16 seconds after the start of the content, "5", "8" and "16" may be used as the components of the feature vector.

As described above, each feature vector indicates features of content, such as a scene change or the appearance pattern of silent zones.

In addition to the generation of the feature vector, the feature-vector computation unit 3 may extract, from the content at each detected feature time, feature information such as an image (preferably, an image having a lower resolution than an actual image) and audio data including sound level data.

At step S7, the feature vector generated at step S6, and the content received by the content input unit 1 are stored in the feature-vector storage unit 4. When the feature-vector computation unit 3 extracts the feature information from the content at each feature time, in addition to the generation of the feature vector, the feature information at each feature time is stored in the feature-vector storage unit 4 in relation to the corresponding numerical value (indicating said each feature time) in the feature vector.

In the above description, the feature-vector computation unit 3 computes a feature vector from content having its non-variable part(s) acquired by excluding the variable part(s) from the content. However, the same advantage can be acquired even by computing a feature vector from content including a variable part (variable parts), and storing, in the storage unit 4, the feature vector along with position (time) information that indicates the position (time) at which each variable part included in the content appears, and is used to eliminate each variable part.

In the above-described manner, each feature vector used as a content identifier is computed from broadcasting content or DVD content.

The feature vector employed in this embodiment is characterized in that it does not contain variable parts, i.e., CM parts, and indicates features of content, such as scene changes and the appearance pattern of silent zones. This means that the feature vector is not influenced by information belonging to the content, such as a broadcasting date and broadcasting station, and is only related to the content itself. In other words, even if the same content is broadcasted on different dates and/or by different broadcasting stations between different local areas, or even if different CMs are inserted in the same content when this content is rebroadcasted, the same feature vector can be acquired.

Second Embodiment

Figures 3, 4:
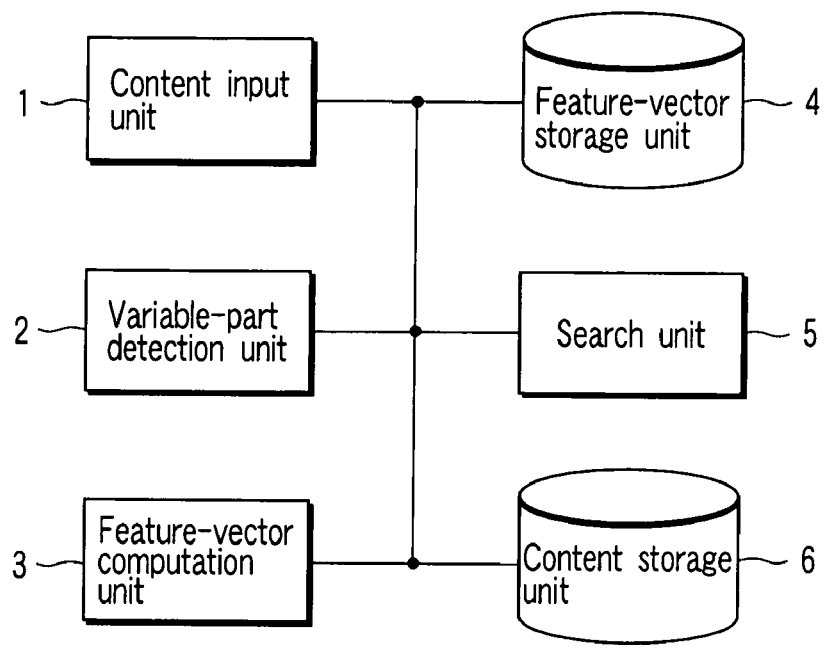
FIG. 3 is a block diagram illustrating a configuration example of a search system according to a second embodiment of the invention.
FIG. 4 is a view illustrating data examples stored in a feature-vector storage unit.

FIG. 3 shows a configuration example of a search system according to a second embodiment of the embodiment, which employs the feature-vector generation apparatus of FIG. 1. In FIG. 3, elements similar to those of FIG. 1 are denoted by corresponding reference numerals, and a description will be given of only different elements. The search system of FIG. 3 employs, as well as the elements of the feature-vector generation apparatus of FIG. 1, a search unit 5 for searching for content using the above-described feature vector, and a content storage unit 6 for storing content.

As shown in FIG. 4, the feature-vector storage unit 4 stores, for example, feature vectors and feature information generated by the feature-vector generation apparatus from pieces of broadcasting content and used to identify the broadcasting content pieces. The unit 4 further stores link information (for example, addresses assigned to storing areas for the broadcasting content) linked to broadcasting content pieces stored in, for example, the content storage unit 6 and used to read the pieces. The feature-vector storage unit 4 stores, in relation to data IDs, record data including the feature vectors, feature information and link information linked to content. The record data may include content itself instead of the link information. In any case, it is sufficient if the feature vectors and feature information are stored in relation to the content. Namely, it is sufficient if when the search unit 5, described later, detects certain record data, the piece of content corresponding to the feature vector and feature information included in this record data can be specified.

There is a case where a request to store content and the content itself are input to the content input unit 1, and there is a case where a request to search for content and the content itself are input to the content input unit 1.

The content storing operation including the feature-vector generating operation performed when a request to store content and the content are input is similar to that of the first embodiment. That is, as described in the first embodiment, a feature vector is generated from the content, and record data including the feature vector, feature information, link information indicating the corresponding content, and data ID is stored in the feature-vector storage unit 4.

When a request to search for content and the content itself are input to the content input unit 1, a feature vector is generated from the content as in the first embodiment. Further, the search unit 5 uses the generated feature vector as a search condition to search the record data stored in the feature-vector storage unit 4 for record data containing the same feature vector as that included in the search condition. From the detected record data, desired content (i.e., the content to be searched for) is acquired.

The operation performed when a request to search for content is input to the content input unit 1 will be described in more detail.

The operation of generating a feature vector from the content input to the input unit 1 together with the search request is the same as that of the first embodiment. Assume here that a feature vector a is generated. The feature-vector computation unit 3 transfers the generated feature vector a to the search unit 5. Using the feature vector a as a search condition, the search unit 5 searches the feature-vector storage unit 4 for a record data item (record data items) including a feature vector (feature vectors) similar to the feature vector a.

In a feature-vector generation process in which every feature vector is generated from content having its non-variable part(s) acquired by excluding the variable part(s) from the content, the feature vectors stored in the feature-vector storage unit 4 and the feature vector as the search condition are directly used for a search.

In contrast, in a feature-vector generation process in which each feature vector is generated from content with one or more variable parts, data indicating the variable part(s) is eliminated, before a search, from the feature vectors stored in the feature-vector storage unit 4 and the feature vector as the search condition. As described above, variable-part data is stored in the feature-vector storage unit 4. Therefore, to eliminate variable-part data from the feature vectors stored in the feature-vector storage unit 4, the variable-part data (data indicating the position (time) of each variable part) stored in the feature-vector storage unit 4 is utilized.

In any case, a search is performed using a feature vector extracted from content having its non-variable part(s) acquired by excluding the variable part(s) (CM part(s)) from the content. As a result, even if different CMs are inserted in rebroadcasted content or in the same content broadcasted in different local areas, this content can be identified.

The search unit 5 computes a similarity between each of the feature vectors stored in the feature-vector storage unit 4 and the feature vector as the search condition, and performs a search. In the embodiment, the similarity is acquired by computing, for example, the inner product of each feature vector stored in the feature-vector storage unit 4 and the feature vector as the search condition.

A search using the N-gram method may be performed on the sequence of numerical values corresponding to the feature vector. For instance, the feature vectors stored in the feature-vector storage unit 4 are searched to detect a feature vector formed of N numerical values that are arranged in series and included in the feature vector as the search condition. For example, even when the feature vectors stored in the feature-vector storage unit 4 are generated from pieces of content having their non-variable part(s) acquired by excluding the variable part(s) from the content, and the feature vector a as the search condition is generated from only part of a certain piece of content, a search using the N-gram method enables a feature vector (or feature vectors) similar to the feature vector a to be searched for from the feature vectors stored in the feature-vector storage unit 4, and also enables the positions of the similar feature vector(s) to be detected. In this case, the feature vector as the search condition (search query) may not be generated from all feature times. When the number of feature times is too large, an upper limit (e.g., 200 feature times from the start) may be set so that a feature vector is generated from a predetermined number of feature times.

Further, for a search, the search unit 5 may generate a histogram concerning the temporal length of each segment of each feature vector, and compute a similarity in histogram between each feature vector stored in the feature-vector storage unit 4 and the feature vector as the search condition. In this case, concerning the histogram of the temporal length of each segment between each feature vector stored in the feature-vector storage unit 4 and the feature vector as the search condition, if the sum of the differences between the frequencies of corresponding temporal lengths between the two vector features does not exceed a predetermined threshold value, the two vector features are determined to be similar to each other.

The thus-computed similarity is based on the frequency with which the same feature timing is detected in each feature vector. In other words, the similarity does not depend upon the order of each segment, and hence much cost is not required for searches. In light of this, searches using the histograms are used as a pre-process, in which feature vectors included in all feature vectors stored in the feature-vector storage unit 4 and similar in histogram to the feature vector a as the search condition are beforehand detected. A search method using "inner product" or "N-gram method" is used to search the thus-restricted range of feature vectors for a feature vector (or feature vectors) similar to the feature vector a as the search condition.

Further, when the feature-vector storage unit 4 stores, as shown in FIG. 4, feature information (image data, audio data including sound level data, etc.) acquired at each feature time, as well as feature vectors, and the search unit 5 receives, from the feature-vector computation unit 3, the feature vector a as the search condition, and information (image data, audio data including sound level data, etc.) acquired at each feature time, the feature information is compared in units of feature times, as well as the computation of similarities between feature vectors. As a result, more detailed searches can be executed. Similarity between images and between audio data including sound level data can be easily computed using known techniques. For instance, the similarity between images is computed by converting the images into brightness-value vectors, and calculating the inner product of the vectors to compare the vectors. Further, concerning the similarity between sound levels, if the difference between the sound levels is smaller than a predetermined threshold value, they are considered similar to each other.

The feature-vector computation unit 3 does not always generate the completely same feature vector from the same content. Each time the feature-vector computation unit 3 generates a feature vector from the same content, detected feature times may slightly be deviated from the correct ones, and slightly different feature vectors be generated. However, if the search unit 5 performs searches based on the above-described similarities between feature vectors, a certain range of differences can be absorbed.

As described above, the search unit 5 searches the feature-vector storage unit 4 for feature vectors similar to the feature vector a as the search condition, to detect a record data item including a feature vector most similar to the feature vector a, i.e., to detect a piece of content that matches the search condition. Alternatively, the search unit 5 may detect a plurality of record data items including feature vectors similar to the feature vector a as the search condition.

The search system of the second embodiment can easily and reliably detect desired content when the above-described feature vector is given as a search condition, even if the same content is broadcasted on different times and/or by different broadcasting stations, or even if different CMs are inserted in the same content between different local areas.

In the second embodiment, a feature vector is generated from broadcasting content to search for the same broadcasting content as the first-mentioned one. However, the content is not limited to broadcasting content, but the same advantage can be acquired by the same process as the above even from content stored in, for example, DVDs available in the market. Some pieces of content stored in DVDs available in the market may be similar but contain slight differences. For instance, different versions of the same content, which are different in editing method, may be sold in the form of different packages. These packages can be detected as similar content pieces. In this case, the variable-part detection unit 2 detects video data different between the different versions, or detects CM information contained in the versions, thereby detecting variable parts to facilitate the detection of similar content pieces.

Third Embodiment

FIG. 5 shows a configuration example of a search system according to a third embodiment, which employs the feature-vector generation apparatus of FIG. 1. The search system of the third embodiment is a client-server system that comprises a server 100 and a plurality of clients 101 (FIG. 5 shows only one client for facilitating the drawing). In FIG. 5, elements similar to those of FIG. 1 or 3 are denoted by corresponding reference numerals. Each client 101 comprises a content input unit 1, variable-part detection unit 2, feature-vector computation unit 3, communication unit 7 and meta data output unit 9. The communication unit 7 and meta data output unit 9 are used to communicate with the server 100. Each client 101 is connected to a content viewing apparatus 102 for reproducing/displaying broadcasting content received or content read from a recording medium, such as a DVD.

The server 100 includes a communication unit 8 used to communicate with each client 101, a feature-vector storage unit 4 and a search unit 5.

There is a case where a request to store meta data, content and the meta data itself are input to the content input unit 1, and there is a case where a request to search for content and the content itself are input to the content input unit 1.

When a request to store meta data, content and the meta data itself are input to the content input unit 1 of a certain client 101, a feature vector is generated from the content as in the first embodiment, and the feature vector, the input meta data, etc. are transmitted from the client 101 to the server 100 via the communication unit 7. Upon receiving the feature vector, meta data, etc. sent from the client 101, via the communication unit 8, the server 100 stores record data including the feature vector, meta data, etc. into the feature-vector storage unit 4.

When the feature-vector computation unit 3 of each client 101 computes a feature vector from content having a variable part (variable parts), each client 101 transmits variable-part data to the server 100 along with the feature vector, and the server 100 stores, into the feature-vector storage unit 4, record data including the feature vector, meta data and variable-part data.

The feature-vector storage unit 4 stores a plurality of record data items that include the meta data of content, feature vector, etc., and are sent from each client 101, as will be described later.

When a request to search for content and the content itself are input to the content input unit 1 of a certain client 101, a feature vector is generated from the content as in the first embodiment, and the search request including the feature vector as a search condition is transmitted from the client 101 to the server 100 via the communication unit 7. Upon receiving the search request via the communication unit 8, the search unit 5 of the server 100 searches the feature-vector storage unit 4 for a record data item including a feature vector most similar to the feature vector as the search condition of the search request, and returns the detected record data item to the client 101.

Meta data corresponding to certain content is, for example, an opinion or comments of a user on the content (device). For receiving a request to store meta data, the client-server system of FIG. 5 utilizes a bulletin board system (BBS). That is, the content input unit 1 of each client 101 utilizes a bulletin board system to receive a request to store meta data. To make a request to store meta data indicating their opinion or comments on certain content, the user of each client 101 writes meta data on a predetermined page provided by the bulletin board system (BBS). At this time, the feature-vector computation unit 3 computes a feature vector from the content input to the content input unit 1. This feature vector is sent along with the meta data. The meta data indicating an opinion or comments and including the feature vector is sent from each client 101 to the server 100 via the communication unit 7. The server 100 stores, into the feature-vector storage unit 4, the record data including the meta data with the feature vector and received via the communication unit 8.

When a user would like to see meta data, such as an opinion or comments on certain content posted by another user, while seeing the certain content, they input a search request and the content to their client (device) 101 via the content input unit 1. The feature-vector computation unit 3 computes a feature vector from the content, and the search request including the feature vector as a search condition is sent to the server 100. Upon receiving the search request, the search unit 5 of the server 100 searches the feature-vector storage unit 4 for a record data item including a feature vector that is most similar to the feature vector as the search condition of the search request. The meta data contained in the detected record data item is returned to the client 101 as a requester terminal.

As described above, the search system of the third embodiment can easily extract a meta data item corresponding to a certain piece of content from meta data items corresponding to various pieces of content and stored in the feature-vector storage unit 4.

Users can post an opinion concerning a certain scene contained in content, as well as an opinion concerning the entire content. For instance, when a user posts an opinion, they interrupt the content now being replayed through the content viewing apparatus 102 connected to the client 101, and inputs their opinion on the stopped scene to the client 101 using the content input unit 1, i.e., the bulletin board system. The content data replayed through the content viewing apparatus 102 is also input to the content input unit 1. The variable-part detection unit 2 and feature-vector computation unit 3 generate a feature vector from the content data replayed/displayed by the content viewing apparatus 102 and corresponding to the content data input to the content input unit 1, as in the first embodiment. Further, the content viewing apparatus 102 measures time (replay time) elapsing from the start of replay of the content, and outputs the measured time to the content input unit 1 and meta data output unit 9. The content input unit 1 temporarily stores the time when interruption of replay is instructed, and the input opinion (message).

The opinion (message) input by the user is sent to the server 100, along with the feature vector corresponding to the content (i.e., a feature vector generated from the entire content having its non-variable part(s) acquired by excluding the variable part(s) from the content), and the measured replay time. The server 100 stores, into the feature-vector storage unit 4, record data containing meta data, such as the feature vector, replay time and a user's opinion concerning the scene to be replayed at the replay time.

In this embodiment, the feature vector is generated by the variable-part detection unit 2 and feature-vector computation unit 3, based on content that is input to the content input unit 1 and simultaneously replayed/displayed by the content viewing apparatus 102. However, the content may be input to the content input unit 1 and subjected to the variable-part detection unit 2 and feature-vector computation unit 3 to generate the feature vector, before it is replayed/displayed by the content viewing apparatus 102. In this case, when a user interrupts the replay of the content to input their opinion, the feature vector is already generated. Therefore, a request to store meta data, which includes a user's input opinion (message), the feature vector (i.e., feature vector generated from content having its non-variable part(s) acquired by excluding the variable part(s) from the content) and the replay time, is sent to the server 100 immediately after the user inputs the request.

When the feature-vector storage unit 4 of the server 100 stores the feature vector of content, meta data, and the replay time of a scene of the content corresponding to the meta data, another user can display meta data corresponding to a scene (the replay time of the scene) of the same content now being replayed.

For example, when certain content is replayed, a certain user sends, to the server 100 via the communication unit 7, a request to search for the certain content, which includes a search condition, i.e., a feature vector beforehand generated from the certain content by the variable-part detection unit 2 and feature-vector computation unit 3 as in the first embodiment. The server 100 searches the feature-vector storage unit 4 for a record data item including a feature vector that is similar to the feature vector as the search condition of the search request. If a plurality of record data items each including a feature vector that is similar to the feature vector as the search condition exist, they are all detected. The detected record data item or items are returned to the client 101 of the certain user. Namely, before replaying certain content, the client 101 downloads, from the server 100, a record data item (or record data items) including a feature vector that is similar to the feature vector of the certain content, and temporarily stores it (them) in, for example, the meta data output unit 9.

The content viewing apparatus 102 measures the replay time of the content replayed/displayed, and outputs the replay time to the content input unit 1 and metal-data output unit 9. The meta data output unit 9 compares the replay time output from the content viewing apparatus 102 with that included in each downloaded record data item. If the replay time output from the content viewing apparatus 102 is identical to that included in a certain downloaded record data item (i.e., if the scene corresponding to the replay time contained in the certain downloaded record data item is replayed/displayed), the meta data contained in the certain record data item is displayed.

Figures 6, 7, 8:
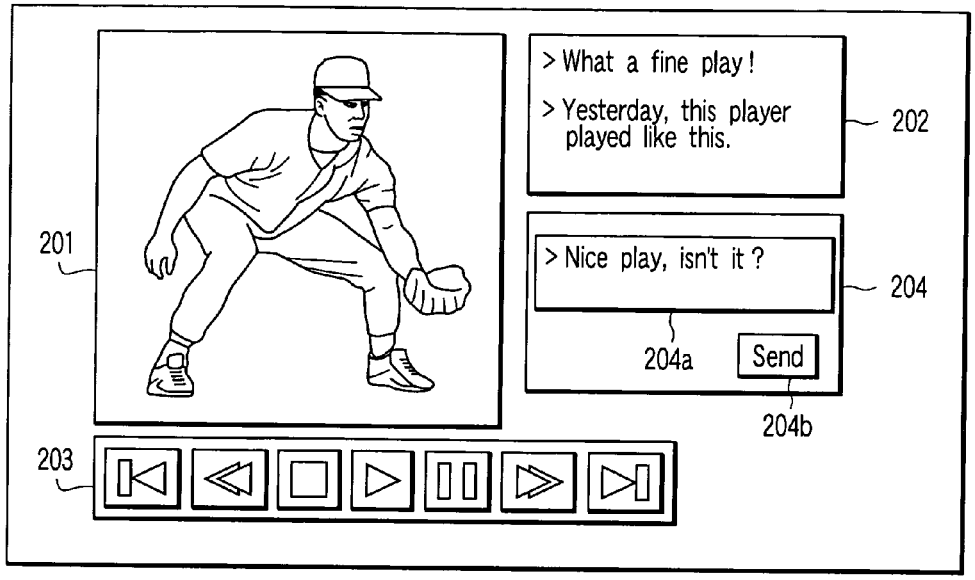
FIG. 6 is a view illustrating a display example of meta data.
FIG. 7 is a view illustrating a record data example stored in the feature-vector storage unit.
FIG. 8 is a view illustrating an example of a BBS table.

FIG. 6 shows a display example of meta data. Specifically, it shows an example of the screen of the content viewing apparatus 102. In this example, the screen comprises a content display area 201, meta data display area 202, content control area 203 and message write-in area 204. This screen displays content, meta data, etc., under the control of the content input unit 1 and meta data output unit 9.

The content display area 201 displays the content replayed by the content viewing apparatus 102.

The meta data display area 202 displays meta data contained in each record data item, downloaded from the server 100 and temporarily stored in the meta data output unit 9, in accordance with the replay time contained in each record data item.

When sending a request to store meta data, the user interrupts the replay of content, writes their message into an area 204a incorporated in the message write-in area 204, and pushes a send button 204b. Then, the content input unit 1 temporarily stores the replay time (the measured time ranging from the replay start time to the replay-interrupted time) output from the content viewing apparatus 102. After that, a feature vector is generated from the content having its non-variable part(s) acquired by excluding the variable part(s) from the content, using the variable-part detection unit 2 and feature-vector computation unit 3, as in the first embodiment (alternatively, a feature vector corresponding to the content may be generated beforehand as mentioned above). The vector feature is transmitted from the communication unit 7 to the server 100, along with the message (meta data) and replay time temporarily stored in the area 204a.

FIG. 7 shows a record data example stored at this time in the feature-vector storage unit 4 of the server 100.

As shown, record data is stored in the feature-vector storage unit 4 with, for example, data ID "3" for identifying the record data attached thereto. The record data with data ID "3" contains meta data, "this play is great", included in a storage request from a user, the feature vector of the content corresponding to the meta data, and the replay time (recorded in the "time" column in FIG. 7) of the scene displayed on the content display area 201 when the meta data has been posted. The replay time indicates the period of replay of the content measured from the beginning.

In FIG. 7, record data with data ID "1" stored in the feature-vector storage unit 4 contains a feature vector of "11, 10, 15, 6, 4", a replay time (time) of "153000 milli-seconds", and a message (meta data) of "What a fine play!"

For instance, after a certain user who is viewing the content corresponding to the record data with data ID "1" downloads the record data, when the replay time (time) contained in the record data is reached during viewing the content, the meta data contained in the record data is displayed on the meta data display area 202 as shown in FIG. 7.

The record data with data ID "2" in FIG. 7 contains link information. The destination indicated by the link information is a scene included in content with a feature vector of "10, 5, 13, 5, 4, 6" and corresponding to a replay time of 326000 seconds. After a certain user who is viewing the content corresponding to the record data with data ID "2" downloads the record data, when the replay time (time) contained in the record data is reached during viewing the content, the meta data contained in the record data is displayed on the meta data display area 202 as shown in FIG. 7. The meta data contains link information linked to a destination. Accordingly, when a user clicks a message as the meta data of data ID "2" displayed on the meta data display area 202, the linked destination, i.e., the scene included in the content with the feature vector of "10, 5, 13, 5, 4, 6" and corresponding to the replay time of 326000 seconds, is displayed on the content display area 201.

If BBS itself for posting a message concerning certain content is used as meta data, a feature vector corresponding to the certain content may be beforehand attached to the bulletin board system. Specifically, as shown in FIG. 8, the feature-vector storage unit 4 of the server 100 pre-stores a BBS table containing a plurality of record data items that include feature vectors corresponding to pieces of content and addresses assigned to the bulletin board systems corresponding to the content pieces (recited in the "bbs-url" column in FIG. 8).

In this case, when a user posts their opinion concerning certain content, they input, through the content input unit 1 of the client 101, an instruction to issue a request to search for a bulletin board system. Upon receiving the instruction, a request to search for the bulletin board system, which includes a feature vector pre-generated for the content as a search condition, is transmitted to the server 100 via the communication unit 7.

The search unit 5 of the server 100 searches the BBS table of FIG. 8 for record data including a feature vector most similar to the feature vector included as the search condition in the request for search. The address of the bulletin board system included in the detected record data is returned to the client 101 as the requester terminal. Upon receiving the address of the bulletin board system, the content input unit 1 of the client 101 accesses the address via the communication unit 7, whereby the message write-in area 204 on the display screen of FIG. 6 becomes active. Namely, a message is written to the area 204a of the message write-in area 204, and a request to store the message (meta data) can be transmitted to the server 100.

As described above, when posting a message concerning content, a desired bulletin board system as a destination can be easily detected by a search using a feature vector.

Thus, in the third embodiment, even if the same content is broadcasted or rebroadcasted at different times and/or different broadcasting stations between different local areas, and hence contains different CMs (variable parts), or contains different CMs (variable parts) between different versions of a recording medium, it can be identified using a feature vector corresponding thereto. Accordingly, even if the same content contains one or more variable parts, meta data corresponding to the same content can be easily detected regardless of whether the variable parts are different.

Each client 101 may employ a storage unit, which is not shown in FIG. 5, for storing content pieces in relation to feature vectors corresponding thereto. After a feature vector is generated from certain content, it may be stored in the storage unit so that it can be used for a storage request or search request.

Fourth Embodiment

FIG. 9 is a block diagram illustrating a configuration example of a search system according to a fourth embodiment, which utilizes the feature-vector generation apparatus of FIG. 1. In FIG. 9, elements similar to those of FIG. 3 or 5 are denoted by corresponding reference numerals.

Like the search system of FIG. 5, the search system of FIG. 9 comprises a server 100 and a plurality of clients 101. The clients 101 are connected to a content viewing apparatus 102. Each client 101 comprises a content input unit 1, variable-part detection unit 2, feature-vector computation unit 3, feature-vector storage unit 4, search unit 5 and communication unit 7. The feature-vector storage unit 4 stores, as shown in FIG. 4 or 7, a feature vector generated by the variable-part detection unit 2 and feature-vector computation unit 3 based on each piece of content input via the content input unit 1, and record data including meta data corresponding to each piece of content. The search system further comprises the meta data output unit 9 shown in FIG. 5, and a content editing unit 10 for editing content using meta data downloaded from the server 100 as described later.

The server 100 includes a communication unit 8, meta data storage unit 11 and search unit 12. The meta data storage unit 11 stores meta data items each including a feature vector. The search unit 12 searches the meta data storage unit 11 for meta data using a feature vector, like the search unit 5, or searches the meta data storage unit 11 for meta data using, as key data, a character string supplied as a search condition.

The meta data storage unit 11 of the server 100 may store meta data sent from each client 101 and as shown in FIG. 7.

The search system of the configuration shown in FIG. 9 can perform the same process as the search system of the third embodiment. For instance, in the search system of FIG. 5, the server 100 includes the search unit 5, and performs a search based on a feature vector in response to a search request from each client 101. In contrast, in the search system of FIG. 9, since each client 101 includes the search unit 5, it searches for meta data using the search unit 5 and a feature vector generated therein.

The operation of the fourth embodiment, which differs from that of the third embodiment, will be described.

The meta data storage unit 11 of the server 100 shown in FIG. 9 stores meta data including editing information for editing content. Editing information acquired by deleting an unnecessary part from content, re-editing parts collected from a plurality of pieces of content, or attaching an annotation to content, using a device for editing content, is transmitted from the client 101 to the server 100, along with a meta data storage request including a feature vector corresponding to the content. Upon receiving the meta data storage request, the server 100 stores, into feature-vector storage unit 4, record data including the feature vector and the editing information as meta data.

If a certain user searches for the editing information of content, a search request using the feature vector of the content as a search condition is transmitted from the client 101 of the certain user to the server 100. The server 100 searches the feature-vector storage unit 4 for a record data item including a feature vector most similar to the feature vector as the search condition, and returns, to the client 101 as the requester terminal, the detected record data item or the meta data contained in it.

The content editing unit 10 of the client 101 edits the content using the meta data returned as the search result from the server 100. Namely, if the meta data is editing information that includes information indicating the unnecessary part of the content, the content viewing apparatus 102 is controlled based on the editing information so that it does not replay the unnecessary part. Further, if the meta data contains editing information for displaying an annotation for a certain scene in the content, the content viewing apparatus 102 is controlled so that it simultaneously displays the annotation and the scene.

The meta data storage unit 11 of the server 100 may pre-store such meta data as shown in FIG. 10. The meta data shown in FIG. 10 is data downloaded by each client 101 and used by it for editing content.

The meta data of FIG. 10 indicates editing in which video data with identifier "videoid=1" and video data with identifier "videoid=2" are replayed in order, audio data with identifier "audioid=1" and video data with identifier "audioid=2" are replayed in order, a message of "this is part A of the show" is displayed while the video data with identifier "videoid=1" is replayed, and a message of "this is part B of the show" is displayed while the video data with identifier "videoid=2" is replayed.

More specifically, the video data with identifier "videoid=1" is the video data part of content having a feature vector of "1, 9, 8, 7, 12, 3, 4" (a numerical sequence of "1, 9, 8, 7, 12, 3, 4" indicated by element <uri vector> in FIG. 10), which is replayed during a period of "1000 milli-seconds" (indicated by element <uri duration> in FIG. 10) elapsing from the replay time, "153000 milli-seconds", of the head of the content (indicated by <uri time> in FIG. 10).

At the same time as the replay of the video data, the audio data with identifier "audioid=1", i.e., the audio data part of the content having the feature vector of "1, 9, 8, 7, 13, 2, 1" (a numerical sequence of "1, 9, 8, 7, 13, 2, 1" indicated by element <uri vector> in FIG. 10) is replayed during the period of "1000 milli-seconds" (indicated by element <uri duration> in FIG. 10) elapsing from the replay time, "153000 milli-seconds", of the head of the content (indicated by <uri time> in FIG. 10).

Further, while the video data with identifier "videoid=1" is replayed, the message of "this is part A of the show" (indicated by element <message> in FIG. 10) is displayed during a period of "20 seconds" (indicated by element <duration> in FIG. 10) elapsing from the replay time, "5 seconds", of the video data (indicated by <time> in FIG. 10).

Thereafter, the video data with identifier "videoid=2" and the audio data with identifier "audioid=2" are simultaneously replayed.

The video data with identifier "videoid=2" is the video data part of content having a feature vector of "10, 9, 2, 8, 3, 7, 8" (indicated by element <uri vector> in FIG. 10), which is replayed during a period of "50000 milli-seconds" (indicated by element <uri duration> in FIG. 10) elapsing from the replay time, "154800 milli-seconds", of the head of the content (indicated by <uri time> in FIG. 10).

The audio data with identifier "audioid=2" is the audio data part of the content having the feature vector of "10, 9, 2, 8, 3, 7, 8" (indicated by element <uri vector> in FIG. 10), which is replayed during the period of "50000 milli-seconds" (indicated by element <uri duration> in FIG. 10) elapsing from the replay time, "154800 milli-seconds", of the head of the content (indicated by <uri time> in FIG. 10).

Furthermore, while the video data with identifier "videoid=2" is replayed, the message of "this is part B of the show" (indicated by element <message> in FIG. 10) is displayed during a period of "20 seconds" (indicated by element <duration> in FIG. 10) elapsing from the replay time, "10 seconds", of the video data (indicated by <time> in FIG. 10).

The meta data shown in FIG. 10 contains the feature vectors of "1, 9, 8, 7, 12, 3, 4", "1, 9, 8, 7, 13, 2, 1" and "10, 9, 2, 8, 3, 7, 8" corresponding to three pieces of content. Accordingly, if the feature vector included as a search condition in a search request from the client 101 is similar to one of the three vectors, the meta data is searched for by the search unit 12. The server 100 returns the meta data of FIG. 10 as the search result to the client 101 as the requester terminal. The content editing unit 10 of the client 101 uses the meta data to perform content editing. Feature vectors may have a greater size than that shown in FIG. 10. However, for facilitating the description, a feature vector of the shown size is employed.

Note that information indicating the linkage of each feature vector to the corresponding content may be attached in each feature vector area in the meta data of FIG. 10.

Further, if, for example, meta data contains a character string indicating, for example, the title of each piece of content, the character string may be used as a search condition, instead of a feature vector. Specifically, when a user inputs a desired character string to their client 101 through the content input unit 1, a search request including the character string as the search condition is transmitted to the server 100. The search unit 12 of the server 100 searches the meta data storage unit 11 for the meta data that includes the character string as the search condition, and returns the detected meta data to the client 101 as the requester terminal.

In the fourth embodiment, to specify a certain scene contained in certain content, the feature vector of the content (having non-variable part(s) acquired by excluding the variable part(s) from the content), and the replay time of the scene are used. However, the embodiment is not limited to this. For instance, the feature vector may be generated from content data ranging from the head of the content to the point at which the scene appears, or from content data after the scene. When the search unit 5 or 12 performs record data searching using such a feature vector, it searches the feature-vector storage unit 4 or meta data storage unit 11 for a feature vector most similar to a feature vector as a search condition in a certain zone included in the entire numerical sequence.

Fifth Embodiment

Figure 11:
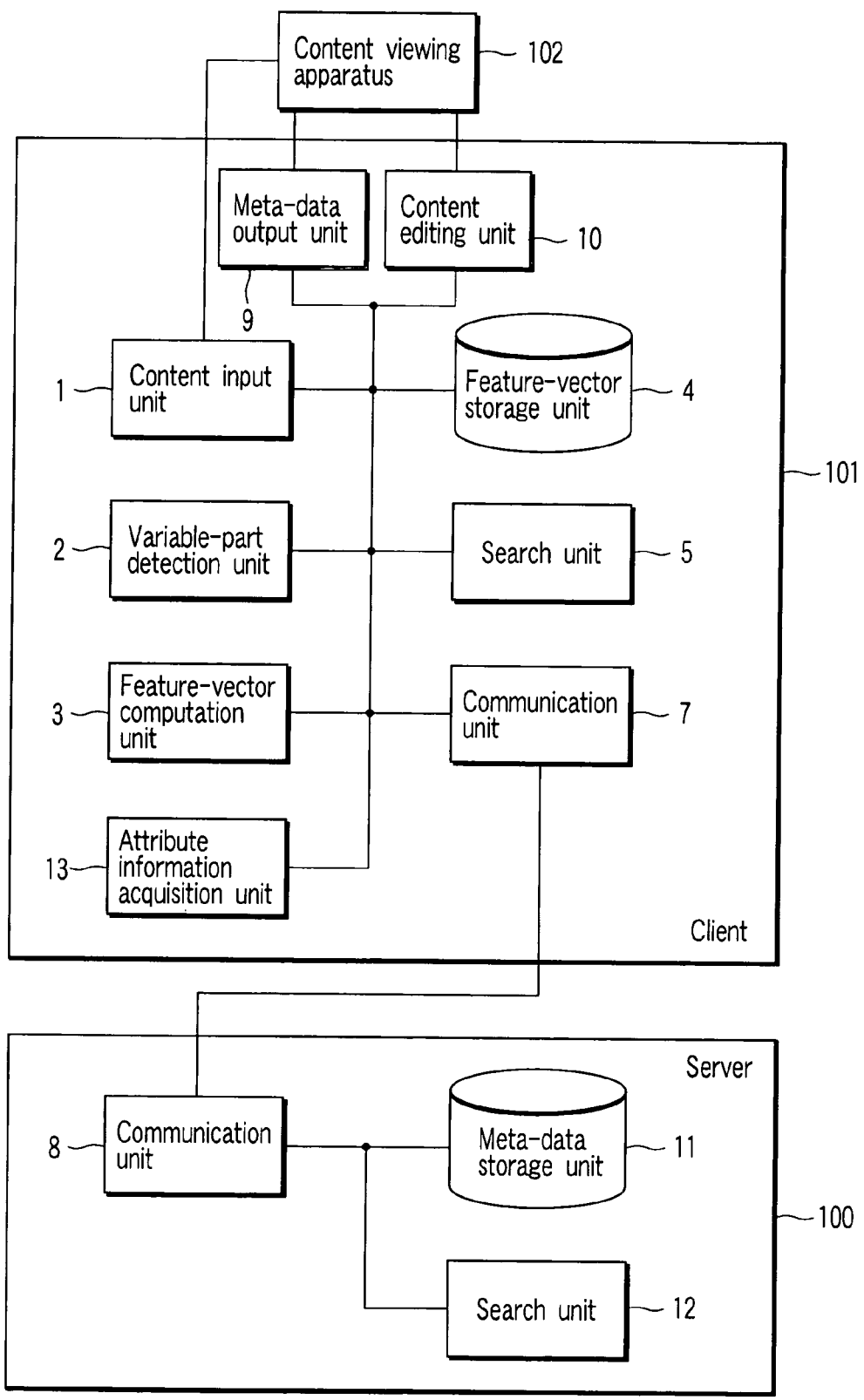
FIG. 11 is a block diagram illustrating a configuration example of a search system according to a fifth embodiment.

FIG. 11 is a block diagram illustrating a configuration example of a search system according to a fifth embodiment, which utilizes the feature-vector generation apparatus of FIG. 1. In FIG. 11, elements similar to those of FIG. 9 are denoted by corresponding reference numerals, and only different elements will be described.

In the fifth embodiment, each client 101 incorporates an attribute information acquisition unit 13 in addition to the elements shown in FIG. 9.

The attribute information indicates the title, broadcasting date and hour, broadcasting station or category of content, comments on the content, etc., and is, for example, electronic program guide (EPG) information.

Figures 12, 14:
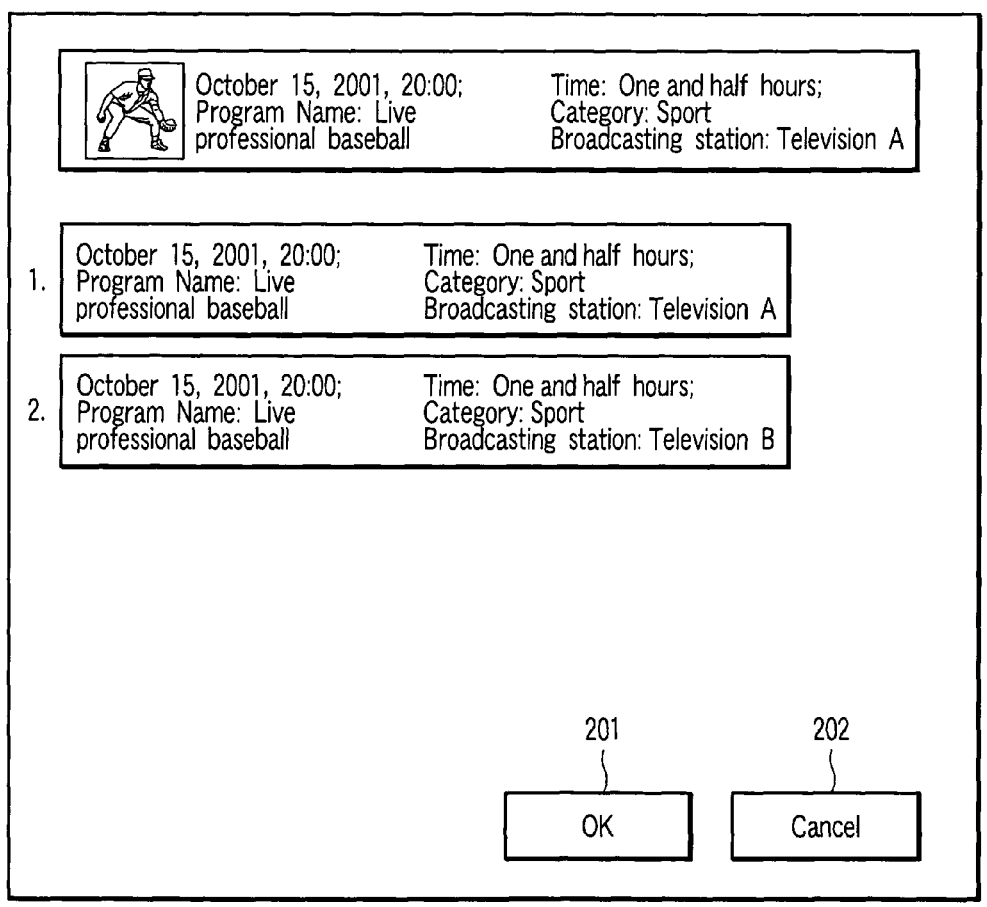
FIG. 12 is a view illustrating another record data example stored in the feature-vector storage unit.
FIG. 14 is a view illustrating a display example of detected meta data.

As shown in FIG. 12, the feature-vector storage unit 4 of each client 101 stores a feature vector generated from each piece of content input via the content input unit 1, attribute information acquired from each piece of content by the attribute information acquisition unit 13, record data items including meta data items and having data IDs. The feature-vector storage unit 4 may store record data downloaded from the server 100. Each record data item may contain link information indicating the storing area in which the corresponding content is actually stored, or the content itself.

The meta data storage unit 11 of the server 100 also stores a great amount of record data that includes feature vectors, attribute information, meta data and data IDs, as shown in FIG. 12. Meta data items stored in the meta data storage unit 11 may include those stored in response to a meta data storage request from each client 101, and those pre-stored.

Assume that a user A in a local area a selects content C1 using attribute information acquired by the attribute information acquisition unit 13, and records the content C1 via the content viewing apparatus 102 (for example, programming of content C1 is performed using the attribute information). In this case, the content C1 is supplied from the content viewing apparatus 102 to the content input unit 1, whereby the variable-part detection unit 2 and feature-vector computation unit 3 generate a feature vector from the content C1 as in the first embodiment. Record data containing the feature vector and the attribute information acquired by the attribute information acquisition unit 13 is stored in the feature-vector storage unit 4. Assume here that the feature vector and attribute information of the content C1 are "B1001" and "E1001", respectively.

Figure 13:
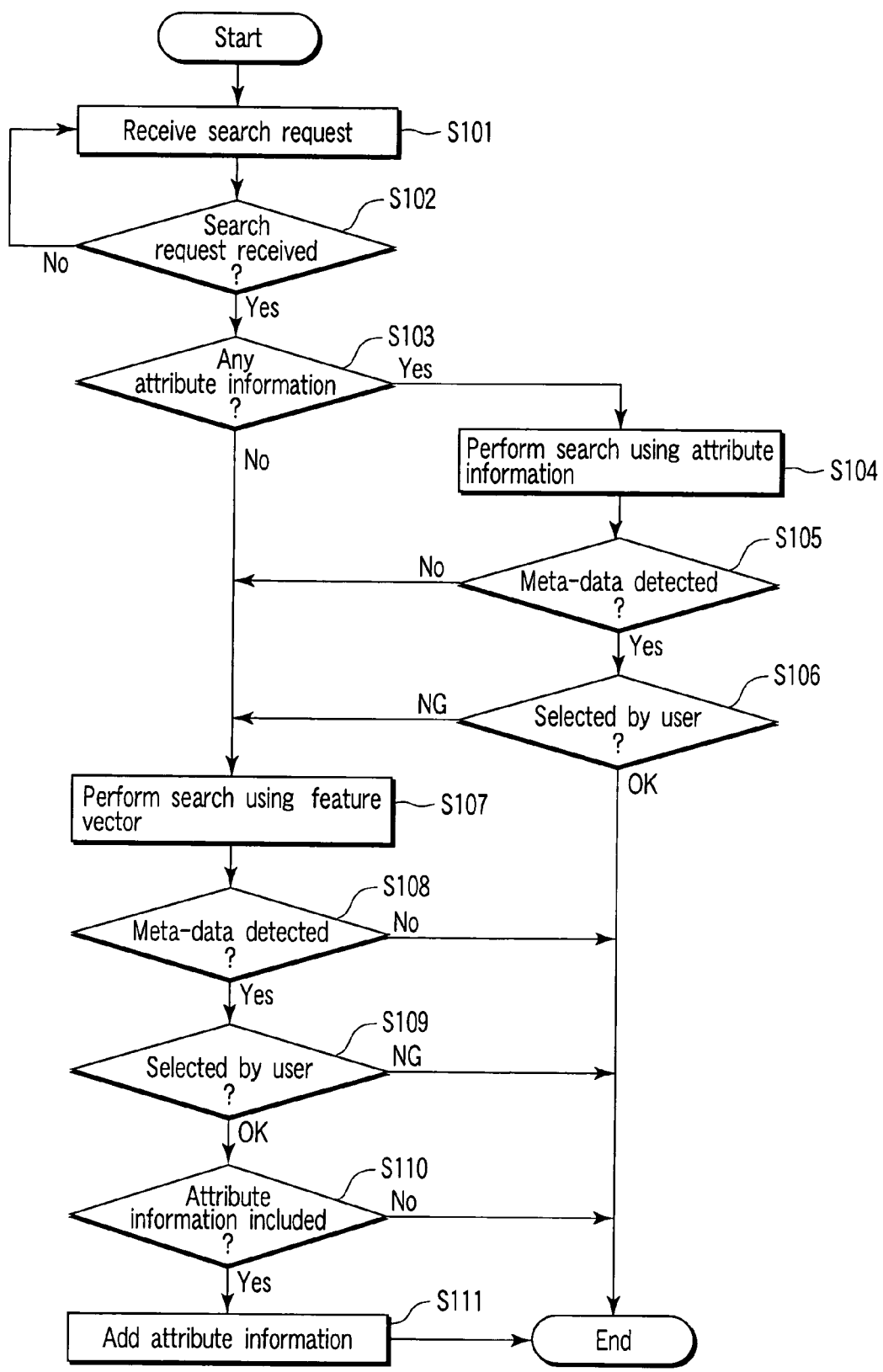
FIG. 13 is a flowchart illustrating the operation of searching for meta data in the search system of FIG. 11.

Referring now to the flowchart of FIG. 13, a description will be given of the meta data searching operation of the search system shown in FIG. 11.

When the user A instructs the client 101 via the content input unit 1 to make a search request including the feature vector "B1001" and attribute information "E1001" as search conditions, this request is transmitted to the server 100 via the communication unit 7.

Upon receiving this search request (steps S101 and S102), the communication unit 8 of the server 100 transfers it to the search unit 12. If the received search request does not contain attribute information, the search unit 12 proceeds to step S107. In contrast, if it contains attribute information as a search condition (step S103), the search unit 12 proceeds step S104, where it searches the meta data storage unit 11 for a record data item (record data items) containing attribute information identical to the attribute information as the search condition. If a record data item (record data items) with attribute information identical to the attribute information "E1001" given as a search condition is detected, it is sent to the client 101 as the requester terminal.

After the communication unit 7 of the client 101 receives the record data item(s) as the search result(s), the meta data output unit 9 displays information, such as meta data contained in the record data item(s), on the content viewing apparatus 102 as shown in FIG. 14. If the user A confirms that the displayed data is the meta data corresponding to the requested content, and pushes an "OK" button 201, the process is finished. If, on the other hand, the user A pushes a "Cancel" button 202, a message that the search result is not identical to the meta data requested by the user A is sent from the content input unit 1 to the server 100 via the communication unit 7 (step S106). Upon receiving this message by the server 100, the search unit 12 performs a search similar to the above, using at this time the feature vector given as the other search condition (step S107).

When a record data item (record data items) including a feature vector (feature vectors) similar to the feature vector "B1001" as the search condition is detected in the record data items stored in the meta data storage unit 11 (step S108), it is sent to the client 101 as the requester terminal.

When the communication unit 7 of the client 101 has received the record data item(s) as the search result(s), the meta data output unit 9 displays information, such as meta data contained in the record data item(s), on the content viewing apparatus 102 as shown in FIG. 14. If there is no meta data corresponding to the content requested by the user A, they again push the "Cancel" button 202, and another message that the meta data requested by the user A is not detected is sent to the server 100 (step S109), followed by the termination of the process. In contrast, if the user A selects desired record data from the displayed meta data and pushes the "OK" button 201, this is reported to the server 100 (step S109). Upon receiving this report, the server 100 proceeds to step S110, where it is determined whether the search conditions received at step S102 include attribution information. If attribute information is included, the program further proceeds to step S111, where the attribute information is added to the record data detected at steps S107 and S108, followed by the termination of the process.

Note that the search process is also finished in the following cases:
When no feature vector identical or similar to the feature vector as the search condition is detected at step S108;

When the user A has pushed the "Cancel" button at step S109 although similar record data is detected; and When it is detected at step S110 that no attribution information is included as a search condition, although the user A has selected one of the detected record data items and pushed the "OK" button.

Assume that when the user A has pushed the "OK" button at step S106, i.e., when the server 100 has received a message that the detected meta data corresponds to the desired content C1. At this time, the process is finished.

Assume then that a user B in a local area β has recorded the same content C1 as the user A, a feature vector "B1002" similar to the feature vector "B1001" has been generated, and that attribution information "E1002" differing from the attribution information "E1001" has been acquired. In this case, to acquire meta data corresponding to the content C1, a search request including the feature vector "B1002" and attribution information "E1002" as search conditions is sent from the client 101 of the user B to the server 100, as in the case of the user A.

At this time, the search unit 5 of the server 100 searches the meta data storage unit 11 for a record data item (record data items) identical to the attribute information "E1002" (steps S101 to S105). The attribute information includes the broadcasting station and broadcasting date and hour of the content.

If no record data with attribute information identical to the attribute information "E1002", the program proceeds to step S107, where the search unit 5 performs a search based on the feature vector "B1002" as the other search condition. Since the feature vector "B1002" is similar to the feature vector "B1001", the record data with data ID "1" shown in FIG. 12 is searched for. This record data contains meta data "M1001" (step S107).

When a search using attribute information and/or feature vector is performed, a plurality of record data items may be detected. The attribute information contained in the detected record data may contain information indicating the category of the corresponding content. The category means types of content, such as "movie", "sport", etc.

The server 100 may store a search request from each user and the history of each meta data storage request. In this case, when a plurality of record data items are detected, the attribute information included in the history of the user B may be referred to, thereby performing a sorting process, such as rearrangement of the detected record data items in order of decreasing appearance frequency concerning their categories.

As shown in FIG. 14, the meta data output unit 9 of the client 101 of the user B displays, on the content viewing apparatus 102, record data items including the record data with data ID "1" detected at step S108. If the user B pushes the "OK" button, a message that the record data with data ID "1" is requested by the user B is sent to the server 100 (step S109). Since the search conditions sent from the user B include attribute information "E1002" (step S110), the server 100 adds this attribute information to the record data with data ID "1" (step S111).

As a result, the record data with data ID "1" containing the meta data "M1001" includes the feature vector "B1001" and attribute information items "E1001" and "E1002".

Before the user B issues the search request, the meta data storage unit 11 of the server 100 already stores another record data item (with, for example, data ID "10") that contains the feature vector "B1002", attribute information item "E1002" and meta data "M1002" differing from the meta data "M1001". This record data item is detected and displayed on the content viewing apparatus 102, along with the record data with data ID "1". If the user B selects the record data with data ID "1" (including the meta data "M1001"), the attribute information "E1002" is added to the record data.

After that, if the client 101 of a user C in the local area β has transmitted, to the server 100, a meta data search request including the feature vector "B1002" and attribute information "E1002" as search conditions, the search unit 5 of the server 100 searches the meta data storage unit 11 using the attribute information "E1002" as in the above case. At this time, since the record data with data ID "1" contains the attribute information items "E1001" and "E1002", the record data with data ID "1" is detected at step S105.

In this case, even if the client 101 of the user C does not have the feature-vector computation unit 3 (i.e., even if no feature vector is included as a search condition), record data, i.e., meta data, corresponding to desired content can be detected using attribute information.

As described above, in the fifth embodiment, even if meta data corresponding to the same content includes different attribute information items since the same content is broadcasted at different times and/or by different broadcasting stations between different areas, or rebroadcasted at different broadcasting dates and hours, it can be easily detected by additionally using a feature vector corresponding to the content.

In the fifth embodiment, attribute information is EPG information, and meta data corresponding to broadcasting content having such attribute information is searched for. However, the search system of the fifth embodiment is not limited to doing this search. In the case of content having such attribute information as EPG information, e.g., content recorded in DVDs available in the market, various versions of the same content are sold. Therefore, if a certain ID unique to the same DVD content of various versions is used as attribute information, meta data searches can be easily performed as described above. The ID unique to DVD content can be generated, for example, in the following manner. A certain amount of data, e.g., 200-Kbyte data, is read from the head portion of DVD data, and a hash value is computed therefrom. The hash value can be utilized as an ID assigned to the DVD data, referring to a hash table.

In the first to fifth embodiments, ID data for identifying certain content, which does not depend upon the information, such as a broadcasting station and/or broadcasting time, belonging to the certain content, is generated from the certain content itself and used to easily detect the same content as the certain content or meta data corresponding thereto.

Since content can be detected regardless of its broadcasting station and/or broadcasting time, it can be easily detected even if it is broadcasted by different broadcasting stations and/or at different broadcasting times (dates and hours) between different local areas. Further, if certain content contains different CMs between, for example, when it is firstly broadcasted and when it is rebroadcasted, it can be identified by eliminating the CMs therefrom.

The functions of the content input section 1, variable-part detection unit 2, feature-vector computation unit 3, search units 5 and 12, communication units 7 and 8, meta data output unit 9, content editing unit 10, attribute-information acquisition unit 13, etc. can be realized by causing a computer to execute the programs that specify the procedures described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A feature-vector generation apparatus comprising:
an input unit configured to input content data including at least one of video data and audio data;
a variable-part detection unit configured to detect, in the content data, a variable part which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium;
a generation unit configured to generate a feature vector, identifying periods ranging from start of modified content data acquired by excluding the variable part from the content data to each of plural times at which at least one of a scene change, a silent zone, and a state in which a sound level is not less than a preset level of the modified content data appears; and
a storage unit configured to store the content data and the feature vector.

2. The apparatus according to claim 1, further comprising a transmission unit configured to transmit a search request including the feature vector used to search the content data for meta data.

3. The apparatus according to claim 1, wherein the feature vector indicates number of the times, and a temporal length of a zone between each pair of adjacent ones of the times at which scene changes, silent zones, and states in which a sound level is not less than a preset level of the modified content data appear.

4. The apparatus according to claim 1, wherein the variable-part detection unit detects, as the variable part, a commercial message part included in the content data.

5. A search apparatus comprising:
a storage unit configured to store each of feature vectors in relation to at least one of content data and meta data of the content data, the content data including at least one of video data and audio data, the feature vectors being generated based on periods ranging from start of modified content data acquired by excluding a variable part from the content data to each of plural times at which at least one state of a scene change, a silent zone, and a state in which a sound level is not less than a preset level of the modified content data;
a variable-part detection unit configured to detect, in first content data including at least one of video data and audio data, a variable part which (A) if the first content data is broadcast, is subject to replacement or omission depending on (i) broadcasting dates and hours of the first content data, (ii) broadcasting stations, and/or (iii) broadcasted area, or (B) if the first content data has been recorded in a recording medium, is different from the version recorded in the recording medium;
a generation unit configured to generate a first feature vector, identifying periods ranging from start of modified first content data acquired by excluding the variable part from the first content data to each of plural times at which the at least one state of the modified first content data appears; and
a search unit configured to search the feature vectors stored in the storage unit for a feature vector similar to the first feature vector.

6. A search apparatus comprising:
a storage unit configured to store feature vectors in relation to meta data of content data, the content data including at least one of video data and audio data, the content data having a variable part which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium, the feature vectors identifying periods ranging from start of modified first content data acquired by excluding the variable part from the content data to each of plural times at which at least one state of a scene change, a silent zone, and a state in which a sound level is not less than a preset level of the modified content data appears;
a receiving unit configured to receive a search request including a first feature vector as a search condition, the first feature vector being generated based on periods ranging from start of modified content data acquired by excluding a variable part from the content data which (A) if the content data is broadcast, is subject to replacement or omission depending on (i) broadcasting dates and hours of the content data, (ii) broadcasting stations, and/or (iii) broadcasted area, or (B) if the second content data has been recorded in a recording medium, is different from the version recorded in the recording medium until at least scene changes, silent zones, and/or sound levels not less than a preset level of the modified content data appear;
a search unit configured to search the feature vectors stored in the storage unit, for a feature vector similar to the first feature vector; and
a transmission unit configured to transmit, to a requester of the search request, a search result including meta data of the feature vector detected by the search unit.

7. The apparatus according to claim 6, wherein the search request further includes attribute information concerning the modified content data, and
the storage unit stores the attribute information in relation to meta data which is included in the meta data transmitted by the transmission unit, and is selected by a user who has issued the search request.

8. A search apparatus comprising:
a storage unit configured to store each of feature vectors in relation to meta data and electronic program guide (EPG) information corresponding to content data, the content data including at least one of video data and audio data, the content data having a variable part which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium, the feature vectors identifying periods ranging from start of modified first content data acquired by excluding the variable part from the content data to each of plural times at which at least one state of a scene change, a silent zone, and a state in which a sound level is not less than a preset level of the modified content data appears;
a receiving unit configured to receive a search request including a first feature vector as a search condition or including, as search conditions, the first feature vector and first EPG information of first content data including at least one of video data and audio data, the first feature vector being generated based on periods ranging from start of modified content data acquired by excluding a variable part from the content data which (A) if the content data is broadcast, is subject to replacement or omission depending on (i) broadcasting dates and hours of the content data, (ii) broadcasting stations, and/or (iii) broadcasted area, or (B) if the second content data has been recorded in a recording medium, is different from the version recorded in the recording medium until at least scene changes, silent zones, and/or sound levels not less than a preset level of the modified content data appear;

a search unit configured to search the EPG information for EPG information identical to the first EPG information, if the search request includes the first EPG information, the search unit searching the feature vectors for a feature vector similar to the first feature vector, if EPG information identical to the first EPG information fails to be detected or if the first EPG information fails to be included in the search request; and a transmission unit configured to transmit, to a requester of the search request, a search result including meta data related to the EPG information identical to the first EPG information and detected by the search unit, or a search result including meta data which is related to the feature vector similar to the first feature vector and is detected by the search unit.

9. The apparatus according to claim 8, wherein if the transmission unit transmits, to the requester, the search result including the meta data related to the feature vector similar to the first feature vector and if the search request includes the first EPG information, the storage unit stores the first EPG information in relation to meta data which is included in the meta data transmitted by the transmission unit and is selected by the requester.

10. A feature-vector generation method comprising:
detecting, in content data including at least one of video data and audio data, a variable which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium;
generating a feature vector identifying periods ranging from start of modified content data acquired by excluding the variable part from the content data to each of plural times at which at least one of a scene change, a silent zone, and a state in which a sound level is not less than a preset level of the modified content data appears.

11. The method according to claim 10, wherein the feature vector indicates number of the times, and a temporal length of a zone between each pair of adjacent ones of the times.

12. A search method comprising:
storing feature vectors in relation to at least one of content data and meta data of content data, the content data including at least one of video data and audio data, the feature vectors being generated based on periods ranging from start of modified content data acquired by excluding a variable part from the content data to each of plural times at which at least one state of a scene change, a silent zone, and a state in which a sound level is not less than a preset level of the modified content data appears;
detecting, in first content data including at least one of video data and audio data, the variable part in the first content data which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium;
generating a first feature vector identifying periods ranging from start of modified first content data acquired by excluding the variable part from the first content data to each of plural times at which the at least one state of the modified first content data appears; and
searching the feature vectors stored in the storage unit for a feature vector similar to the first feature vector.

13. A computer-readable storage medium having embedded therein computer executable instructions, wherein the instructions, when executed by a processor, cause the processor to perform a method, comprising:
accessing a storage unit configured to store each of feature vectors in relation to at least one of content data and meta data of the content data, the content data including at least one of video data and audio data, the feature vectors being generated, identifying periods ranging from start of modified content data acquired by excluding a variable part from the content data to each of plural times at which at least one state of a scene change, a silent zone, and a state in which a sound level is not less than a preset level of the modified content data appears;
detecting, in first content data including at least one of video data and audio data, the variable part in which (A) if the content data is broadcast, is subject to replacement or omission depending on (i) broadcasting dates and hours of the content data, (ii) broadcasting stations, and/or (iii) broadcasted area, or (B) if the content data has been recorded in a recording medium, is different from the version recorded in the recording medium;
generating a first feature vector, based on periods ranging from start of modified first content data acquired by excluding the variable part from the first content data to each of plural times at which the at least one state of the modified first content data appears; and
searching the feature vectors stored in the storage unit for a feature vector similar to the first feature vector.

* * * * *